I. D. GARLICK.

Churn.

No. 7,118.

Patented Feb. 26, 1850.

UNITED STATES PATENT OFFICE.

I. D. GARLICK, OF LYONS, NEW YORK.

CHURN-DASHER.

Specification of Letters Patent No. 7,118, dated February 26, 1850.

*To all whom it may concern:*

Be it known that I, ISAAC D. GARLICK, of Lyons, in the county of Wayne and State of New York, have invented a new and Improved Churn; and I do hereby declare the following to be a full and exact description thereof, reference being had to the accompanying drawings, making a part of this specification, in which—

Figure 1:
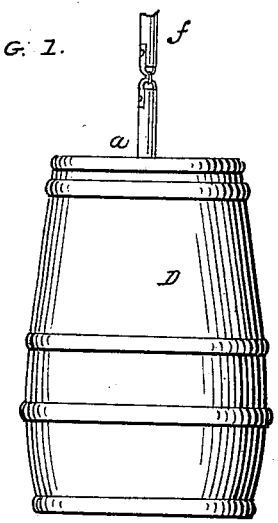
Figure 2:
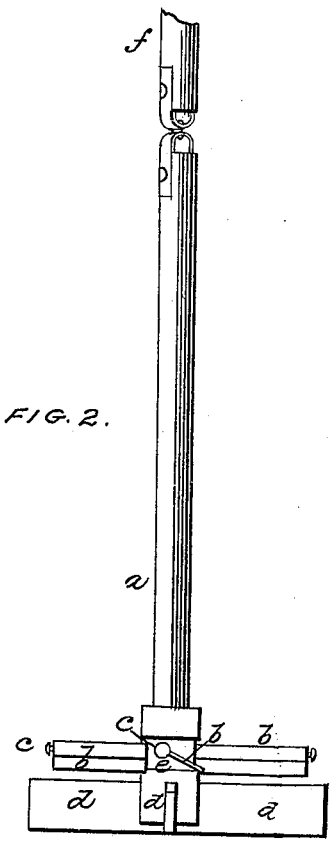
Figure 3:
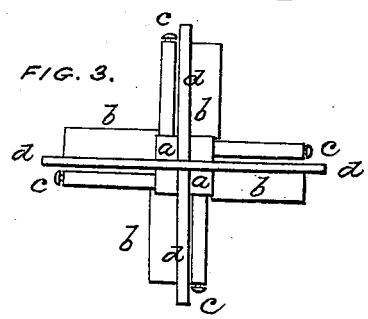

Figure 1, is a side elevation of my improved churn; Fig. 2, a side elevation of the dasher thereof detached, and Fig. 3, a bottom view of the dasher.

Similar letters indicate like parts in all the figures.

The vertical churn tub D, is constructed of staves in any usual and well-known manner: the dasher rod is constructed of two parts $a$, $f$, connected to each other by a swivel joint: radial wings $d$, $d$, are let into and secured to the lower extremity of the lower portion ($a$,) of the dasher rod, having their faces parallel with the sides of the rod; above the wings $d$, $d$, a recess $e$, is formed in each of the four sides of the dasher rod, in which recesses are placed the vibrating metallic beaters $b$, $b$. Each beater $b$, is secured in its place within its recess $e$, by means of a rod or bolt $c$, which passes through eyes, or a continuous beading on one edge of the beater, and has its inner end let into and firmly secured in the dasher rod: the rods or bolts $c$, $c$, are secured in such positions within the recesses $e$, that when the vibrating edges of the beaters rest upon the lower sides of the recesses ($e$,) as shown in Fig. 2, the faces of the beaters will form angles with the dasher rod of from forty to forty five degrees; and when the vibrating edges of the beaters are thrown upward so as to strike against the upper sides of the recesses, ($e$,) the faces of the beaters will be in horizontal positions, at right angles with the dasher rod.

A reciprocating movement is imparted to the dasher by taking hold of and working the upper portion $f$, of the rod, or by attaching machinery thereto; when the dasher is operated in cream, the upward movement thereof will throw the beaters $b$, $b$, into the inclined position represented in Fig. 2, by which they will impart a rotary movement to the dasher, and thereby cause the vertical faces of the wings $d$, $d$, to aid in efficiently acting upon and agitating the cream during their upward movement; and when the dasher is forced downward, the beaters $b$, $b$, will be thrown into a horizontal position, and will thereby displace and agitate a large quantity of cream.

What I claim as my invention and desire to secure by Letters Patent, is—

The hinging the series of beaters $b$, $b$, to the dasher rod in such a manner that their faces will be thrown into inclined positions by the upward movement of the dasher, and into horizontal positions by the downward movement thereof; when the said vibrating beaters ($b$, $b$,) are combined and act in concert with the series of vertical faced beaters or wings $d$, $d$, (upon the same dasher rod) substantially as herein set forth.

The above specification signed and witnessed this 19 day of December 1849.

ISAAC D. GARLICK.

Witnesses:
R. W. ASHLEY, Jr.
SYLVESTER WILDER.